(«12») United States Patent
Shintre et al.

(10) Patent No.: US 10,686,816 B1
(45) Date of Patent: Jun. 16, 2020

(54) INSIDER THREAT DETECTION UNDER USER-RESOURCE BI-PARTITE GRAPHS

(71) Applicant: Symantec Corporation, Mountain View, CA (US)

(72) Inventors: Saurabh Shintre, Sunnyvale, CA (US); Sandeep Bhatkar, Sunnyvale, CA (US); Ashwin Kumar Kayyoor, Sunnyvale, CA (US)

(73) Assignee: NortonLifeLock Inc., Tempe, AZ (US)

( * ) Notice: Subject to any disclaimer, the term of this patent is extended or adjusted under 35 U.S.C. 154(b) by 331 days.

(21) Appl. No.: 15/718,691

(22) Filed: Sep. 28, 2017

(51) Int. Cl.
*H04L 29/06* (2006.01)
*G06N 7/00* (2006.01)

(52) U.S. Cl.
CPC ...... *H04L 63/1425* (2013.01); *H04L 63/1441* (2013.01); *G06N 7/005* (2013.01)

(58) Field of Classification Search
CPC . H04L 63/1425; H04L 63/1441; H04L 29/06; G06N 7/005; G06F 21/55
USPC .......................................................... 726/23
See application file for complete search history.

(56) References Cited

U.S. PATENT DOCUMENTS 9,148,441 B1 * 9/2015 Tamersoy ........... H04L 63/1416
9,516,053 B1 * 12/2016 Muddu ............... H04L 63/1408
2011/0173189 A1 * 7/2011 Singh .................. G06F 16/9024 707/722
2017/0344546 A1 * 11/2017 Nam ........................ G06F 9/48
2018/0248895 A1 * 8/2018 Watson .................. G06N 5/045

OTHER PUBLICATIONS

Ambre, Amruta, and Narendra Shekokar. "Insider Threat Detection Using Log Analysis and Event Correlation." Procedia Computer Science 45 (2015) 436-445. International Conference on Advanced Computing Technologies and Applications.
Brdiczka, Oliver, et al. "Proactive Insider Threat Detection Through Graph Learning and Psyhological Context." IEEE CS Security and Privacy Workshops (2012) 142-149.
Chen, You, Steve Nyemba, and Bradley Malin. "Detecting Anomalous Insiders in Collaborative Information Systems." IEEE Trans Dependable Secure Comput. (2012), 9(3): 332-344.

(Continued)

*Primary Examiner* — Kevin Bechtel
*Assistant Examiner* — Quazi Farooqui
(74) *Attorney, Agent, or Firm* — Holland & Hart LLP

(57) ABSTRACT

A method for insider threat detection under user-resource bi-partite graphs is described. A computing device evaluates a bi-partite mapping of a set of users and a set of files, and performs a random-walk procedure initiating from a selected user of the set of users. The computing device computes a probability distribution associated with the access frequency of each alternate user and file of the random-walk procedure, and compares the probability distribution to one or more distributions associated with temporal periods prior to the initiated procedure. Based on the comparison, the computing device identifies points of maximum variance of the distribution. The computing device identifies the files of the set of files and users of the set of users associated with the points of maximum variance and access raw data to identify activity associated with the selected user and the identified resources.

20 Claims, 12 Drawing Sheets

(56) References Cited

OTHER PUBLICATIONS

Maybury, Mark, et al. "Analysis and Detection of Malicious Insiders." Advanced Research and Development Activity in Information Technology (ARDA). International Conference on Intelligence Analysis (2005).
Sun, Jimeng, Huiming Qu, Deepayan Chakrabarti, and Christos Faloutsos. "Neighborhood Formation and Anomaly Detection in Bipartite Graphs." University of Pittsburgh (2005).
Young, William T., Alex Memory, Henry G. Goldberg, and Ted E. Senator. "Detecting Unknown Insider Threat Scenarios." IEEE Security and Privacy Workshops (2014).
Zhang, Rui, Xiaojun Chen, Jinqiao Shi, Fei Xu, and Yiguo Pu. "Detecting Insider Threat Based on Document Access Behavior Analysis." APWeb Workshops (2014), LNCS 8710, 376-387.
U.S. Appl. No. 15/199,336, filed Jun. 30, 2016.
U.S. Appl. No. 15/629,421, filed Jun. 21, 2017.

* cited by examiner

US 10,686,816 B1

INSIDER THREAT DETECTION UNDER USER-RESOURCE BI-PARTITE GRAPHS

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including file scouting, data theft, and the like. Malware programmers are continually adapting to the improvements made in malware detection. Due to the adapted methods and implementations imposed by malware programmers, security methods for detecting anomalous user-file access methods may be beneficial in detecting malicious behavior.

SUMMARY

According to at least one embodiment, a method for performing insider threat detection under user-resource bi-partite graphs is described. The method may include: computing a probability distribution of a first temporal period, the probability distribution comprising a probability of moving from a first user from a set of users to a second user from the set of users or to a file from a set of files; comparing the probability distribution of the first temporal period to a probability distribution of the first user over a second temporal period; computing a variation between the probability distribution of the first temporal period and the probability distribution of the second temporal period; and identifying anomalous activity in relation to the set of users based at least in part on the variation exceeding a preconfigured threshold.

A computing device configured for performing insider threat detection under user-resource bi-partite graphs is also described. The computing device may include one or more processors and memory in electronic communication with the one or more processors. The memory may store computer executable instructions that when executed by the one or more processors cause the one or more processors to compute a probability distribution of a first temporal period, the probability distribution comprising a probability of moving from a first user from a set of users to a second user from the set of users or to a file from a set of files; compare the probability distribution of the first temporal period to a probability distribution of the first user over a second temporal period; compute a variation between the probability distribution of the first temporal period and the probability distribution of the second temporal period; and identify anomalous activity in relation to the set of users based at least in part on the variation exceeding a pre-configured threshold.

A non-transitory computer-readable storage medium storing computer executable instructions is also described. When the instructions are executed by one or more processors, the execution of the instructions may cause the one or more processors to compute a probability distribution of a first temporal period, the probability distribution comprising a probability of moving from a first user from a set of users to a second user from the set of users or to a file from a set of files; compare the probability distribution of the first temporal period to a probability distribution of the first user over a second temporal period; compute a variation between the probability distribution of the first temporal period and the probability distribution of the second temporal period; and identify anomalous activity in relation to the set of users based at least in part on the variation exceeding a preconfigured threshold.

In some examples of the method, computing device, and non-transitory computer-readable storage medium described above, the second temporal period may precede the first temporal period. Some examples of the method, computing device, and non-transitory computer-readable storage medium described above may further include processes, features, means, or instructions for evaluating a bipartite mapping comprising one or more edges interconnecting the set of users and the set of files. In some examples of the method, computing device, and non-transitory computer-readable storage medium described above, the users of the set of users and the files of the set of files may be disjoint and weighted. Some examples of the method, computing device, and non-transitory computer-readable storage medium described above may further include processes, features, means, or instructions for partitioning the bi-partite mapping into one or more discrete subsets, and selecting a subset of the one or more discrete subsets. In some examples of the method, computing device, and non-transitory computer-readable storage medium described above the probability of moving from the first user to the second user, or moving from the first user to a file may be based at least in part on the number of edges connected to the first user as well as a number of users and/or files connected to the edges of the first user. In some examples of the method, computing device, and non-transitory computer-readable storage medium described above the value of the probability distribution may comprise a vector norm.

Some examples of the method, computing device, and non-transitory computer-readable storage medium described above for computing the probability of the first temporal period may further include processes, features, means, or instructions for performing a first iterative random-walk procedure from the first user to one or more files from the set of files, or to one or more users from the set of users. Some examples of the method, computing device, and non-transitory computer-readable storage medium described above for computing the probability of the first temporal period may further include processes, features, means, or instructions for calculating a value of the probability distribution of the first temporal period, determining the value of the probability distribution of the first temporal period exceeds a pre-configured threshold, and performing a second iterative random-walk procedure from the first user to the one or more files from the set of files, or the one or more users from the set of users.

Some examples of the method, computing device, and non-transitory computer-readable storage medium described above for computing the variation and identifying anomalous activity may further include processes, features, means, or instructions for determining the probability distribution of the first temporal period converges, determining a maximum variation distance between the probability distribution of the first temporal period and the probability distribution of the second temporal period, identifying one or more files from the set of files, or one or more users from the set of users associated with the maximum variation distance, and performing a security action. In some examples of the method, computing device, and non-transitory computer-readable storage medium described above the security action may comprise classifying the one or more identified files and/or users as anomalous. In some examples of the method, computing device, and non-transitory computer-readable storage medium described above the one or more files and/or users associated with the maximum variation distance may indicate one or more arguments of maxima associated with a function of the bi-partite mapping. Some examples of the method, computing device, and non-transitory computer-readable storage medium described above for performing the security action may further include processes, features, means, or instructions for correlating the one or more anomalous files and/or users to specific file access activity, identifying potential risks or threats to the set of users and the set of files based at least in part on the correlating, and determining one or more causes of the anomalous activity.

Some examples of the method, computing device, and non-transitory computer-readable storage medium described above may further include processes, features, means, or instructions for accessing raw data and performing a security action based at least in part on identifying one or more anomalous files and/or users.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
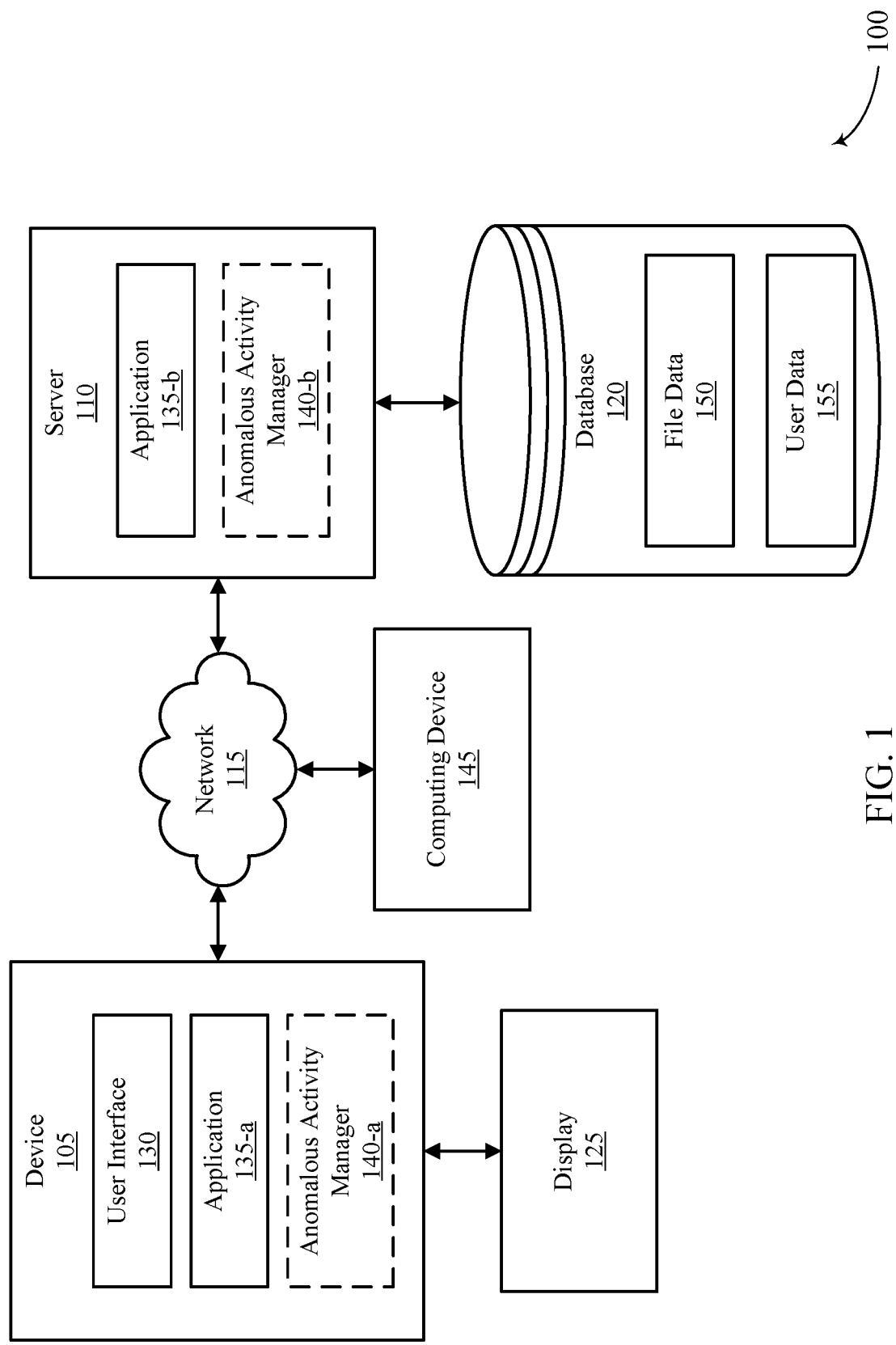
FIG. 1 is a block diagram illustrating one embodiment of an environment that supports insider threat detection under user-resource bi-partite graphs, in accordance with one or more aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

Malware programmers have implemented a variety of methods and techniques for performing malicious behavior, including file scouting and data theft. The procedures may be implemented via malicious programs (e.g., viruses, worms, etc.) as part of at least a software install or file execution at a computing device. For example, a computing device may access a file extension (i.e., a .exe file extension) that has been infected by malware that is overwritten or embedded within the original code of the executable file. As a result of the file execution, the malicious code may execute command instructions or execute an additional code script to download and run a malware payload. The instructions and/or payload may contain computer executable methods for illegally replicating or removing stored data of a network system (e.g., data theft). In addition, accessing the infected file may initiate propagation of the malware code to additional files of the computing device, or additional computing devices connected to the infected device via a server and/or network link.

The described features generally relate to methods, systems and computing devices for detecting anomalous file access patterns among one or more users of a system. A network system may consist of a plurality of computing devices (i.e., users) and a plurality of stored data files. The users and files may be interconnected via one or more network links (e.g., edges) associated with one or more coupled servers of the system. The set of users and the set of files may be disjoint and include a bi-partite mapping, with no edge directly connecting a user to another user, and no edge directly connecting a file to another file. Each set may be partitioned into one or more subsets (e.g., neighborhoods) and increase granularity within the sets. Furthermore, at a point of reference within the mapping (e.g., a specific file or user) each alternate file and/or user of the disjoint sets may be weighted according or one or more criterion or access parameters associated with the mapping. Each file and/or user of the mapping may represent a point of reference within the mapping.

In some embodiments, a user may be classified as a point of reference, and initiate a random-walk procedure for a pre-configured number of steps. At each iteration of the random-walk procedure, the point of reference within the mapping may be updated, and a subsequent file and/or user may be selected according to the weight activity associated with each user and/or file connected to the point of reference (i.e., a resource with a higher weight is more likely to be selected at the iteration). At the conclusion of the random-walk procedure, the user associated with the initiation of the random-walk procedure may initiate an operation of the present systems and methods to evaluate the access frequency for each alternate user and/or file of the mapping and generate a probability distribution associated with the procedure. The user may initiate an operation of the present systems and methods to determine the convergence of the probability distribution via comparison of a scalar value of the distribution to a pre-configured threshold value. In some cases, the scalar value may exceed the threshold value and the user may initiate subsequent random-walk procedures until convergence of the distribution is determined by the device.

The user may initiate an operation of the present systems and methods to evaluate the probability distribution associated with the one or more randomwalk procedures and compare the distribution to a distribution associated with the user during a previous temporal duration. The distribution of the user associated with the previous duration may be stored at a database of the system. Based on the comparison, the user may initiate an operation of the present systems and methods to compute a variance of the compared probability distributions, including a maximum variational distance between the compared probability distributions. The user may initiate an operation of the present systems and methods to identify one or more files and/or users associated with the maximum variational distance. The user may initiate data access procedure to identify the corresponding activity between the user and the identified resources (e.g., files and/or users) of the mapping during the current temporal duration, the prior temporal duration of the comparison, or both. In some cases, initiating data access procedure may include notifying one or more coupled devices of the network (e.g., servers) and performing data access procedure via the devices. In some cases, information stored at a database of the system may be accessed for implementing the data access procedure. Based on the data access procedure, the user may initiate an operation of the present systems and methods to determine anomalous behavior and initiate local security protocols, or notify a computing device to initiate security protocols for the system.

Each user of the bi-partite mapping may initiate an operation of the present systems and methods to perform the aforementioned procedure and determine whether anomalous activity is present within alternate user and/or file access patterns of the user. In the case that anomalous activity is detected, each user may initiate an operation of the present systems and methods to enact a data access procedure in collaboration with computing devices and databases coupled to the system. In other embodiments, a computing device (e.g., a server) may select a user of the bi-partite mapping and initiate one or more random-walk procedures from the selected user. Each random-walk procedure may consist of a pre-configured number of steps, and each alternate file and/or user of the procedure may be selected according to the weight activity associated with the alternate user and/or file. At the conclusion of the one or more random-walk procedures, the computing device may evaluate the access frequency of each alternate user and/or file according to the selected user and generate a probability distribution associated with the procedure. The computing device may determine the convergence of the probability distribution via comparison of a computed scalar value of the distribution to a pre-configured threshold value. In some cases, the scalar value may exceed the threshold value, and the computing device may initiate subsequent random-walk procedures from the selected user, until convergence of the distribution is determined.

The computing device may evaluate the probability distribution associated with the one or more random-walk procedures and compare the distribution of the selected user to a distribution of the selected user during a previous temporal duration. The computing device may access the temporal data via a database coupled to the system, either internally or externally, via one or more network links. Based on the comparison, the computing device may compute a maximum variational distance between the compared probability distributions and identify one or more alternate files and/or users associated with the maximum variational distance. The computing device may then access one or more alternate computing devices or databases of the system and perform a data access procedure to identify the corresponding activity between the selected user and the identified resources of the mapping. The dato access procedure may correspond to the current temporal duration, the prior temporal duration of the comparison, or both. Based on the data access procedure, the computing device may determine anomalous activity within the system and initiate security protocols.

The computing device may select and perform the aforementioned random-walk procedure for each user of the bi-partite mapping. Furthermore, the computing device may implement data access procedure for each of the selected users that exhibit anomalous file access patterns and initiate one or more security protocols.

FIG. 1 is a block diagram illustrating one embodiment of an environment 100 that supports insider threat detection under user-resource bi-partite graphs, in accordance with one or more aspects of the present disclosure. In some embodiments, the systems and methods described herein may be performed on a device (e.g., device 105). As depicted, the environment 100 may include a device 105, server 110, a display 125, a computing device 145, and a network 115 that allows the device 105, server 110, and the computing device 145 to communicate.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a computing device integrated within device 105, or as depicted, may be in communication with a computing device 145 via network 115. Examples of the computing device 145 may include any combination of a mobile computing device, a laptop, a desktop, a server, a media set top box, or any combination thereof. Examples of server 110 may include any combination of a data server, a cloud server, a server associated with an automation service provider, proxy server, mail server, web server, application server, database server, communications server, file server, home server, mobile server, name server, or any combination thereof.

In some embodiments, the device 105 may include a user interface 130, an application 135-*a*, and an anomalous activity manager 140-*a*. Although the components of the device 105 are depicted as being internal to the device 105, it is understood that one or more of the components may be external to the device 105 and connect to device 105 through wired or wireless connections, or both. In some embodiments, application 135-*a* may be installed on computing device 145 in order to allow a user to interface with a function of device 105, anomalous activity manager 140-*a*, or server 110.

In some embodiments, the server 110 may include an application 135-*b*, and an anomalous activity manager 140-*b*. Although the components of the server 110 are depicted as being internal to the server 110, it is understood that one or more of the components may be external to the server 110 and connect to server 110 through wired or wireless connections, or both. In some embodiments, application 135-*b* may be installed on computing device 145.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include anomalous activity manager 140-*a*. For example, device 105 may include application 135-*a* that allows device 105 to interface with a user via an anomalous activity manager 140 located on another device such as computing device 145, server 110 (e.g., anomalous activity manager 140-*b* at server 110), or both. In some embodiments, device 105 and server 110 may include anomalous activity manager 140-*a* and/or 140-*b* where at least a portion of the functions of anomalous activity manager 140-*a* and/or 140-*b* are performed separately or concurrently on device 105, server 110, or both. Similarly, in some embodiments, a user may access the functions of device 105 (directly or through device 105 via anomalous activity manager 140-*a*) from computing device 145. For example, in some embodiments, computing device 145 includes a mobile application that interfaces with one or more functions of device 105, anomalous activity manager 140-*a*, or server 110.

In some embodiments, server 110 may be coupled to database 120. Database 120 may be internal or external to the server 110. In one example, device 105 may be coupled directly to database 120, database 120 being internal or external to device 105. Database 120 may include file data 150 and user data 155. For example, device 105 may access file data 150 in database 120 over network 115 via server 110. File data 150 may include parameter data associated with each of the one or more files of the system at recorded temporal durations. File data 150 may include at least data related to one or more partitions or neighborhoods of the set of files and data related to the connections of the set of files. User data 155 may include parameter data associated with one or more users of the set of users at recorded temporal durations. User data 155 may include data related to connections and probability distributions associated with the set of users.

In some embodiments, anomalous activity manager 140-*a* and 140-*b* may be configured to perform the systems and methods described herein in conjunction with user interface 130 and application 135-*a* and 135-*b*. Further details regarding anomalous activity manager 140-*a* and 140-*b* are discussed below.

Figure 2A:
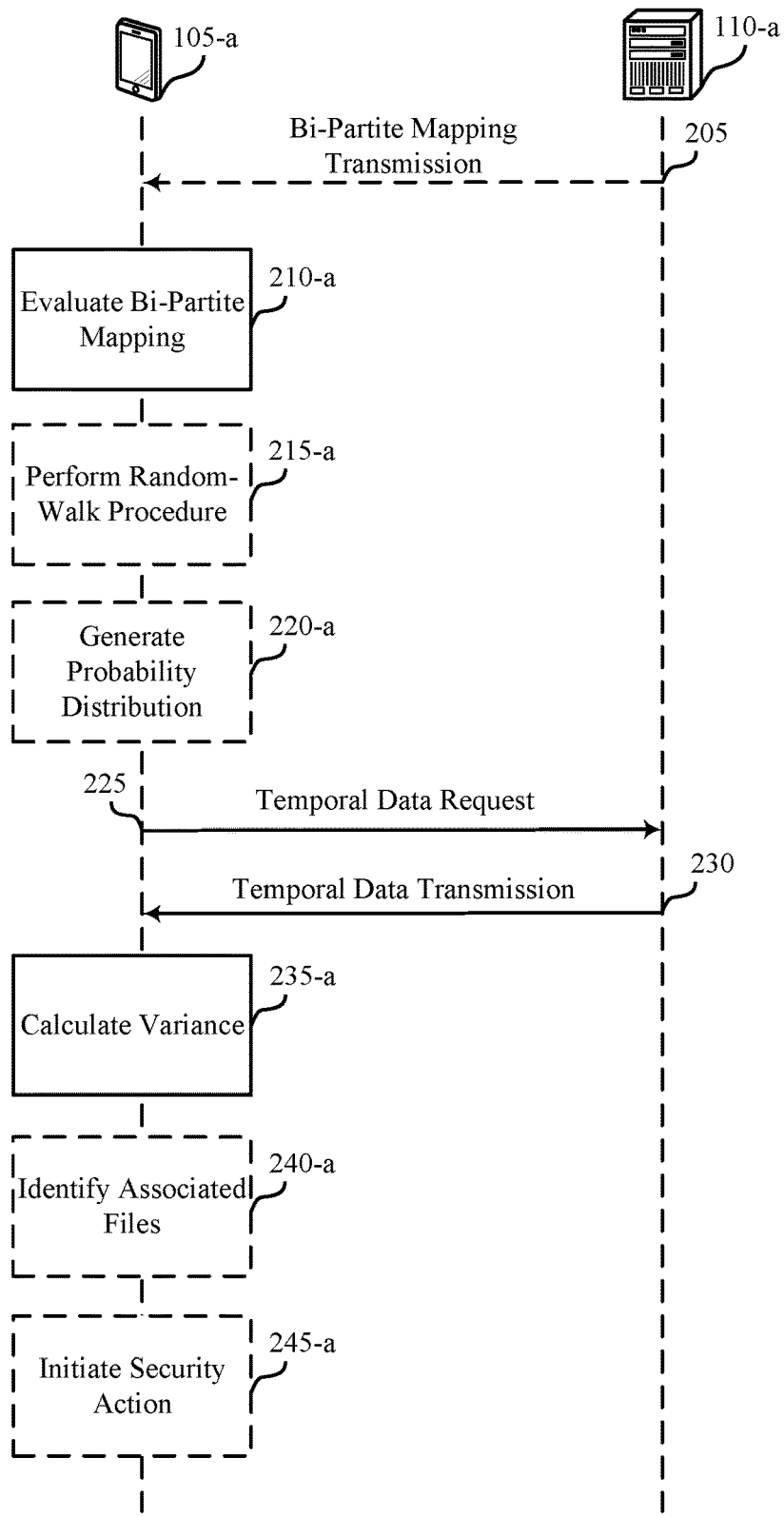
FIGS. 2A and 2B illustrate examples of process flows that support insider threat detection under user-resource bi-partite graphs, in accordance with one or more aspects of the present disclosure.
Figure 2B:
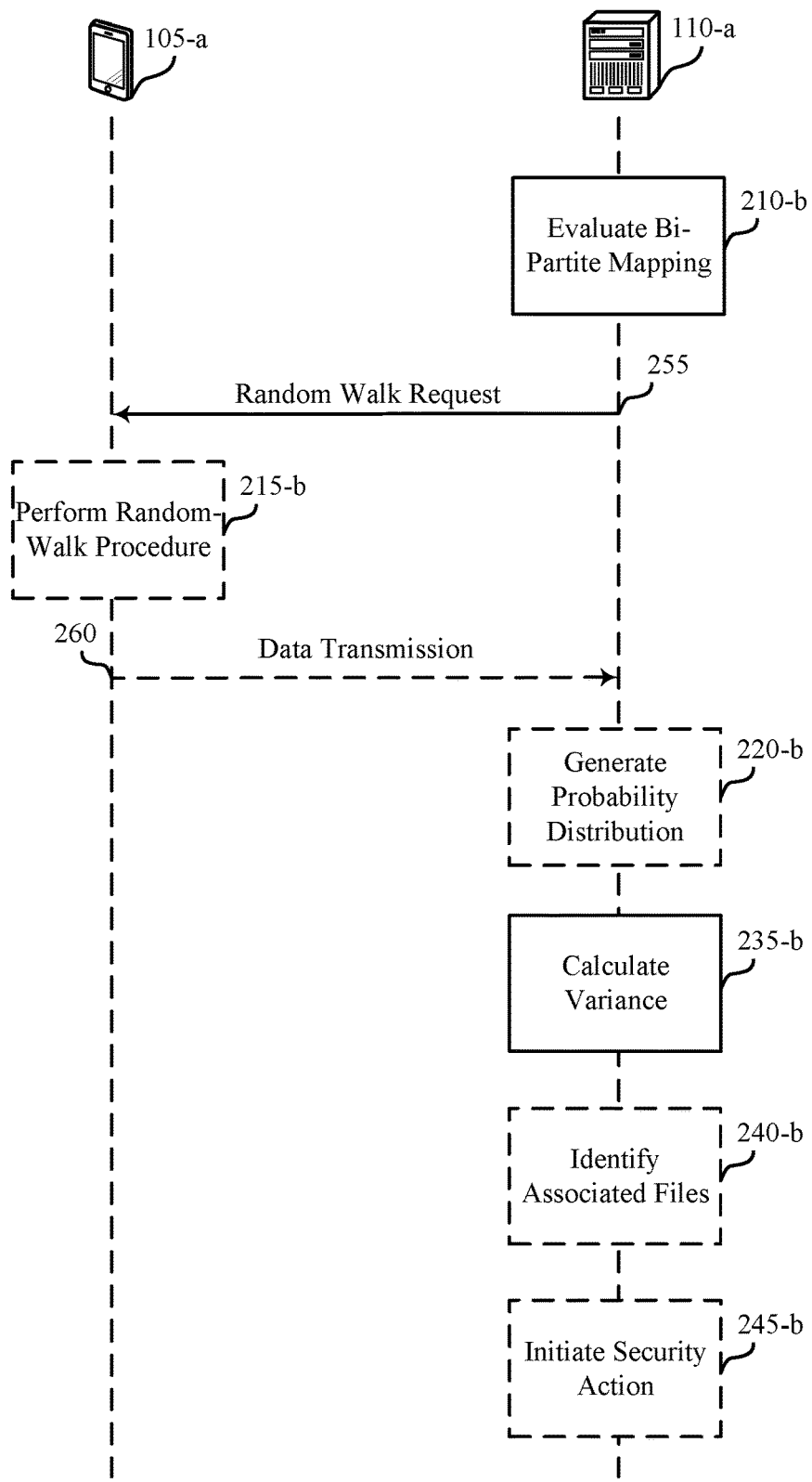

FIGS. 2A and 2B illustrate examples of process flows 200-*a* and 200-*b* that support insider threat detection under user-resource bi-partite graphs, in accordance with one or more aspects of the present disclosure. In some configurations, process flows 200-*a* and 200-*b* may be implemented by anomalous activity manager 140-*a* or 140-*b* with reference to FIG. 1. In some configurations, process flows 200-*a* and 200-*b* may be implemented in conjunction with application 135-*a* or 135-*b* and/or the user interface 130 described with reference to FIG. 1. Device 105-*a* and server 110-*a* may be an example of aspects of device 105 and server 110 as described with reference to FIG. 1. Additionally or alternatively, in some configurations, server 110-*a* may be an example of aspects of a computing device 145 as described with reference to FIG. 1.

As illustrated in FIG. 2A, operations at process flow 200-*a* may be between device 105-*a* and server 110-*a*. The operations may be transmitted in a different order than the exemplary order shown, or the operations performed by device 105-*a* or server 110-*a* may be performed in different orders or at different times. Certain operations may also be left out of the process flow 200-*a*, or other operations may be added to the process flow 200-*a*.

At 205, server 110-*a* may transmit a bi-partite mapping transmission to device 105-*a*. The transmission may include an orientation (e.g., a network orientation) of all users of the set of users and all files of the set of files within the system. The users and files may be interconnected via one or more network links (e.g., edges) associated with one or more coupled servers, including server 110-*a*. The set of users and the set of files may be disjoint and include a bi-partite mapping, with no edge directly connecting a user to another user, and no edge directly connecting a file to another file. Each set may be partitioned into one or more subsets (e.g., neighborhoods) to at least increase granularity within the sets. At a file and/or user, each alternate file and/or user may be weighted according to one or more criterion or access parameters of the mapping. For example, at a given file, a weight at each alternate file and/or user may be determined according to the number of edges connecting the given file to the alternate file/user, the number of edges exclusive to the given file and the alternate file/user, or both. Similarly, at a given user, a weight at each alternate file and/or user may be determined according to the number of edges connecting the given user to the alternate file/user, the number of edges exclusive to the given user and the alternate file/user, or both. Device 105-*a* may receive the transmission 205 and process the included data. In some cases, the mapping and/or weightings for each file and/or user of the mapping may be composed within one or more matrices consisting of row and column vectors. The vectors of the matrices may be normalized to improve computation procedure at device 105-*a*.

At 210-*a*, device 105-*a* may evaluate the bi-partite mapping as at least a preemptive measure for performing subsequent procedure at the device. Device 105-*a* may analyze the data of the transmission and organize the received data with device 105-*a* as the point of reference within the system. The analysis may include recognition of one or more partitions within the set of users that include device 105-*a*, configuration for the edge weightings associated with the device 105-*a*, as well as alternate devices and/or users within the mapping.

At 215-*a*, device 105-*a* may initiate a random-walk procedure consisting of one or more pre-configured step iterations. Device 105-*a* may select an alternate file and/or user of the procedure during the first iteration, in accordance with the weight of the file/user at device 105-*a*. For subsequent iterations of the procedure, the selected file/user may be updated as the point of reference within the procedure, and an alternate file and/or user may be selected in accordance with the assigned weight at the point of reference. At the conclusion of the random-walk procedure, device 105-*a* (i.e., the point of reference at initiation of the random access procedure) may evaluate the access frequency of each alternate user and/or file of the bi-partite mapping, per the random-walk procedure. At 220-*a* and based on the evaluation, device 105-*a* may generate a probability distribution associated with the random-walk procedure. The probability distribution may include the access frequency of each of the alternate users and/or files of the bi-partite mapping. In some cases, the probability distribution may compose a probability vector, and may be normalized.

In some cases, device 105-*a* may perform multiple iterations of steps 215-*a* and 220-*a*. For example, device 105-*a* may perform steps 215-*a* and 220-*a* and evaluate the generated probability distribution. The evaluation may include computing a scalar value (e.g., a scalar norm) of the generated distribution and comparing the computed scalar value to the pre-configured threshold value. The scalar value may exceed the threshold value, representing a lack of convergence. As a result, device 105-a may initiate subsequent procedure and repeat steps 215-a and 220-a. Device 105-a may perform iterations of steps 215-a and 220-a until the value of the generated distribution is convergent.

At 225, device 105-a may transmit a temporal data request to server 110-a. The temporal data request may include a request for probability distribution data of the device 105-a associated with one or more temporal periods preceding the implemented random-walk procedure, iterative or otherwise. Server 110-a may receive the request and access one or more databases of the system to retrieve the requested data. In some cases the one or more databases may be directly coupled to server 110-a either internally or externally. In other cases, the one or more databases may be coupled to server 110-a via one or more network links. At 230, server 110-a may transmit the retrieved temporal data in accordance with the request 225. Device 105-a may receive the temporal data transmission, and process the included data.

At 235-a, device 105-a may compare the probability distribution of one or more iterations of steps 215-a and 220-a with the received distribution data included in transmission 230. Device 105-a may calculate the variance of the compared distributions, including one or more points of maximum variational distance between the distributions. Device 105-a may compare the one or more points of maximum variational distance to a pre-configured threshold value and determine if malicious activity is present within the file access patterns of the device. For example, if the maximum variational distance exceeds the threshold value, device 105-a may determine malicious activity is present at the current temporal duration of the comparison, during a prior temporal duration of the comparison, or both.

At 240-a, and based of the determination of malicious activity, device 105-a may initiate a data access procedure to identify the associated files and/or users corresponding to the points of maximum variational distance. Device 105-a may access raw data of the system via one or more coupled computing devices, and identify activity corresponding to the user and associated files and/or users of the system during a time duration of the determined malicious activity. In some cases, device 105-a may notify one or more coupled devices of the network, including server 110-a about the data access procedure.

At 245-a, device 105-a may initiate a security action based on the determination of malicious activity and the data access procedure. In some cases, device 105-a may initiate a local security action at the device. Additionally or alternatively, device 105-a may notify one or more computing devices of the system or alternate files and/or users for initiating additional security action within the system, of varying scope.

As illustrated in FIG. 2B, operations at process flow 200-b may be between device 105-a and server 110-a. The operations may be transmitted in a different order than the exemplary order shown, or the operations performed by device 105-a or server 110-a may be performed in different orders or at different times. Certain operations may also be left out of the process flow 200-b, or other operations may be added to the process flow 200-b.

At 210-b, server 110-a may evaluate a bi-partite mapping associated with the set of users and the set of files within the system associated with the server. The users and files of the mapping may be interconnected via one or more network links (e.g., edges) associated with one or more coupled servers, including server 110-a. The set of users and the set of files may be disjoint and include a bi-partite mapping, with no edge directly connecting a user to another user, and no edge directly connecting a file to another file. Each set may be partitioned into one or more subsets (e.g., neighborhoods) to at least increase granularity within the sets. At a file and/or user, each alternate file and/or user may be weighted according to one or more criterion or access parameters of the mapping. For example, at a given file, a weight at each alternate file and/or user may be determined according to the number of edges connecting the given file to the alternate file/user, the number of edges exclusive to the given file and the alternate file/user, or both. Similarly, at a given user, a weight at each alternate file and/or user may be determined according to the number of edges connecting the given user to the alternate file/user, the number of edges exclusive to the given user and the alternate file/user, or both.

Server 110-a may evaluate the mapping and select a device 105-a for initiating a random-walk procedure. At 255, server 110-a may transmit a randomwalk request to the selected device 105-a, including instructions for performing a random-walk procedure at the selected device. Device 105-a may receive the transmission and process the included data, including the instructions for performing random-walk procedure.

At 215-b, device 105-a may initiate a random-walk procedure consisting of one or more pre-configured step iterations. An alternate file and/or user of the procedure may be selected during the first iteration, in accordance with the weight of the file/user at device 105-a. For subsequent iterations of the procedure, the selected file/user may be updated as the point of reference within the procedure, and an alternate file and/or user may be selected in accordance with the assigned weight at the point of reference. At 260, in accordance with the conclusion of the random-walk procedure, device 105-a (i.e., the point of reference at initiation of the random access procedure) may evaluate the access frequency of each alternate user and/or file of the bi-partite mapping and transmit the results (e.g., data) to server 110-a. Server 110-a may receive and process the transmitted data for constructing a probability distribution.

At 220-b, server 110-a may generate a probability distribution associated with the random-walk procedure. The probability distribution may include the access frequency of each of the alternate users and/or files of the bi-partite mapping via the selected device 105-a. In some cases, the probability distribution may compose a probability vector, and may be normalized. Server 110-a may then compute a scalar value (e.g., a scalar norm) of the generated distribution and compare the value to a pre-configured threshold value. In the case that the scalar value exceeds the threshold value, representing a lack of convergence, server 110-a may provide notification to device 105-a. Based on the notification, device 105-a may initiate subsequent procedure and repeat steps 215-b and 260. Server 110-a may perform step 220-b in accordance with each received transmission 260 until the value of the generated distribution is convergent.

At 235-b, server 110-a may access one or more databases of the system to retrieve one or more probability distributions associated with a temporal period preceding the implemented random-walk procedure, iterative or otherwise. In some cases the one or more databases may be directly coupled to server 110-a either internally or externally. In other cases, the one or more databases may be coupled to server 110-a via one or more network links. Server 110-a may compare the probability distribution of the implemented random-walk procedure to the one or more retrieved probability distributions and calculate the variance of the compared distributions, including one or more points of maximum variational distance between the distributions. Server 110-*a* may compare the one or more points of maximum variational distance to a pre-configured threshold value and determine if malicious activity is present within the file access patterns of the device 105-*a*. For example, if the maximum variational distance exceeds the threshold value, server 110-*a* may determine malicious activity is present at the current temporal duration of the comparison, during a prior temporal duration of the comparison, or both.

At 240-*b*, and based of the determination of malicious activity, server 110-*a* may initiate a data access procedure to identify the associated files and/or users corresponding to the anomalous access patterns of the device. Server 110-*a* may access raw data of the system via one or more network links. In some cases, server 110-*a* may communicate with one or more coupled computing devices in accessing the raw data. Based on the data access, server 110-*a* may identify activity corresponding to device 105-*a* during a time duration of the determined malicious activity.

At 245-*b*, server 110-*a* may initiate a security action based on the determination of malicious activity and the data access procedure. In some cases, server 110-*a* may initiate a security action at the network. In other cases, server 110-*a* may notify at least the device 105-*a* and provide command instructions for initiating a local security action at the device.

Figure 3:
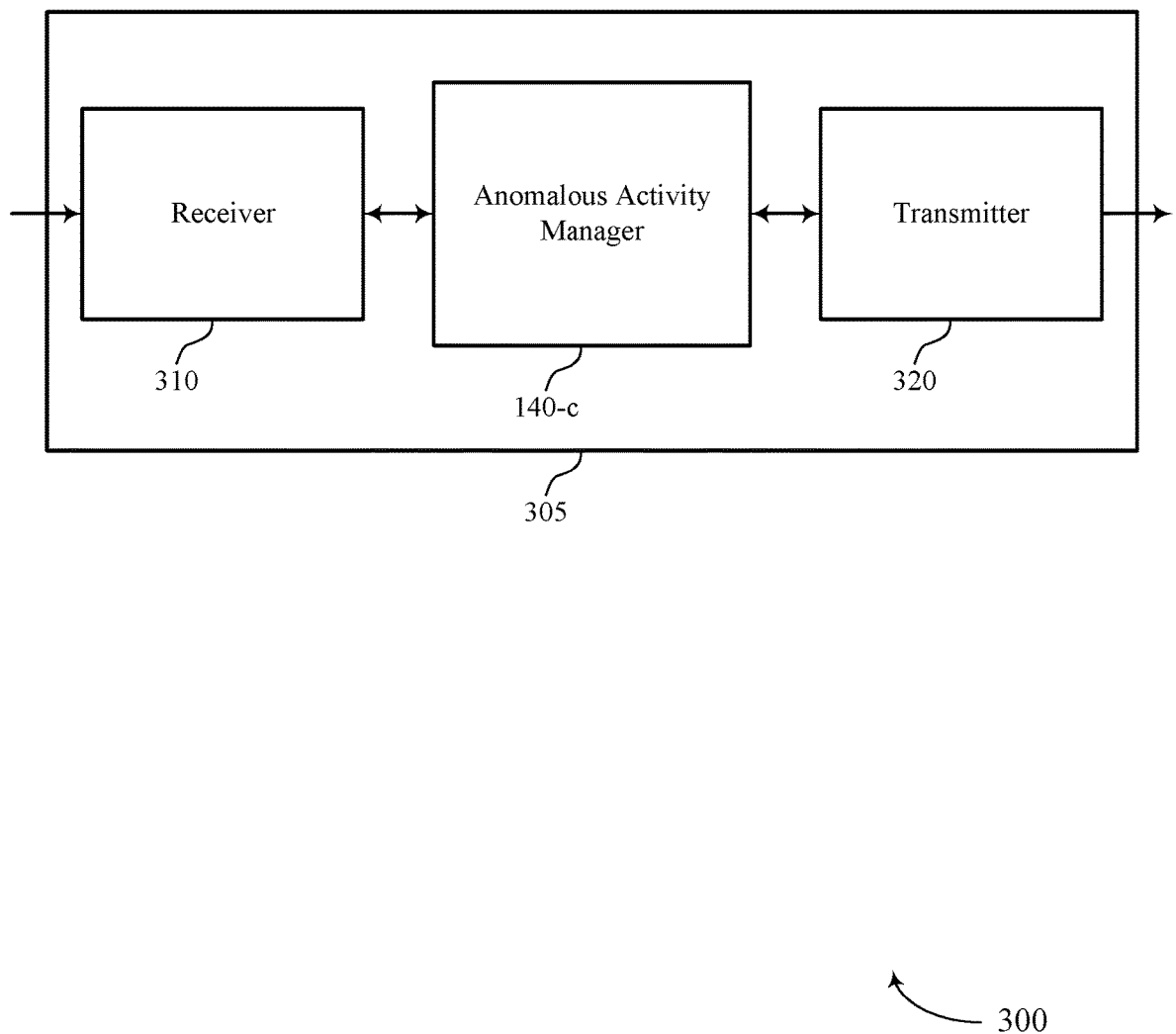
FIGS. 3 through 5 illustrate block diagrams of a device that supports insider threat detection under user-resource bi-partite graphs, in accordance with one or more aspects of the present disclosure.

FIG. 3 illustrates a block diagram 300 of a device 305 that supports insider threat detection under user-resource bi-partite graphs, in accordance with one or more aspects of the present disclosure. Device 305 may be an example of aspects of a device 105 or a computing device 145, including a server 110, as described with reference for FIG. 1. Device 305 may include a receiver 310, an anomalous activity manager 140-*c*, and a transmitter 320. Device 305 may also include one or more processors. Each of the components of device 305 may be in communication with one another (e.g., via one or more buses).

Receiver 310 may receive data corresponding to the user-file access patterns of a device, including information regarding a bi-partite mapping of the system, data associated with a random-walk procedure, temporal data stored at a database, and the like. Receiver 310 may receive the data via an exchange server associated with a target domain of the device 305. Receiver 310 may communicate with server 110 or computing device 145 over a network 115 as described with reference to FIG. 1. A received message and components of the message may be passed on to other components of the device 305. In some cases, receiver 310 may be an example of aspects of the transceiver 625 described with reference to FIG. 6. The receiver may utilize a single antenna or a set of antennae.

Anomalous activity manager 140-*c* may be an example of aspects of anomalous activity manager 140-*a* and anomalous activity manager 140-*b* described with reference to FIG. 1. Characteristics of anomalous activity manager 140-*c* and/or at least some sub-components of anomalous activity manager 140-*c* may be implemented in hardware, software executed by one or more processors, firmware, or any combination thereof. If implemented in software executed by one or more processors, functions of anomalous activity manager 140-*c* and/or at least some of the various sub-components of anomalous activity manager 140-*c* may be executed by one or more general purpose processors, digital signal processors (DSPs) applicationspecific integrated circuits (ASICs), field-programmable gate arrays (FPGAs), or other programmable devices, discrete gates or transistor logic, discrete hardware components, or any combination thereof designed to perform the functions described in the present disclosure.

Anomalous activity manager 140-*c* and/or at least some of the various sub-components of anomalous activity manager 140-*c* may be physically located at various positions, including being distributed such that portions of functions are implemented at different physical locations by one or more physical devices. In some examples, anomalous activity manager 140-*c* and/or at least some of the various sub-components of anomalous activity manager 140-*c* may be separate and distinct components in accordance with various aspects of the present disclosure. In other examples, anomalous activity manager 140-*c* and/or at least some of the various sub-components of anomalous activity manager 140-*c* may be combined with one or more other hardware components, including but not limited to an I/O component, a transceiver, a network server, another computing device, one or more other components described in the present disclosure, or a combination thereof in accordance with various aspects of the present disclosure.

Anomalous activity manager 140-*c* may evaluate a bi-partite mapping, including a set of files and a set of users connected via one or more network links (e.g., edges) and initiate one or more random-walk procedures at a point of reference (e.g., a specified user) for a pre-configured number of iterative steps. Anomalous activity manager 140-*c* may evaluate the access frequency of each alternate user and/or file of the point of reference for each random-walk procedure, and generate a probability distribution. The probability distribution may include the access frequency of each of the alternate users and/or files of the bi-partite mapping. In some cases, the probability distribution may compose a probability vector, and may be normalized.

Anomalous activity manager 140-*c* may access temporal data comprising at least probability distribution data for the point of reference at a time period prior to the implemented random-walk procedure, iterative or otherwise. In some cases, anomalous activity manager 140-*c* may directly access the data via a database coupled to anomalous activity manager 140-*c*. In other cases, anomalous activity manager 140-*c* may access received temporal data subsequent to a transmitted request. Anomalous activity manager 140-*c* may compare the one or more probability distributions of the accessed temporal data to the generated probability distribution of the procedure. Based on the comparison, anomalous activity manager 140-*c* may calculate a variance of the compared distributions and initiate a data access procedure based on the variance. For example, anomalous activity manager 140-*c* may compare the generated probability distribution to at least one probability distribution of the temporal data and compute one or more points of maximum variance between the compared distributions. Anomalous activity manager 140-*c* may then determine the points of maximum variance exceed a pre-configured threshold of the manager, and initiate a data access procedure for the alternative files and/or users associated with the points.

Anomalous activity manager 140-*c* may then initiate procedure to access raw data associated with the point of reference and the alternative files and/or users associated with the points of maximum variance. Anomalous activity manager 140-*c* may identify anomalous activity at one or more time periods, including the duration of the generated probability distribution, the one or more durations of the temporal data, and the like. In some cases, anomalous activity manager 140-c may access the raw data via direct connection to one or more alternative computing devices, databases, files, or users. In other cases, anomalous activity manager 140-c may evaluate received data in accordance with one or more computing devices, databases, files, or users via one or more network links and processing at receiver 310.

In some cases, anomalous activity manager 140-c may enact one or more security protocols based on the data access procedure. The security protocols may be on a local basis associated with one or more individual or sets of users and/or files, or the network system as a whole.

Transmitter 320 may at least transmit signals generated by other components of device 305, provide notification to one or more components of the device 305, and route data information. In some examples, transmitter 320 may be collocated with a receiver (e.g., receiver 310) in a transceiver component. For example, transmitter 320 may be an example of aspects of the transceiver 625 described with reference to FIG. 6. Transmitter 320 may utilize a single antenna or a set of antennae.

Figure 4:
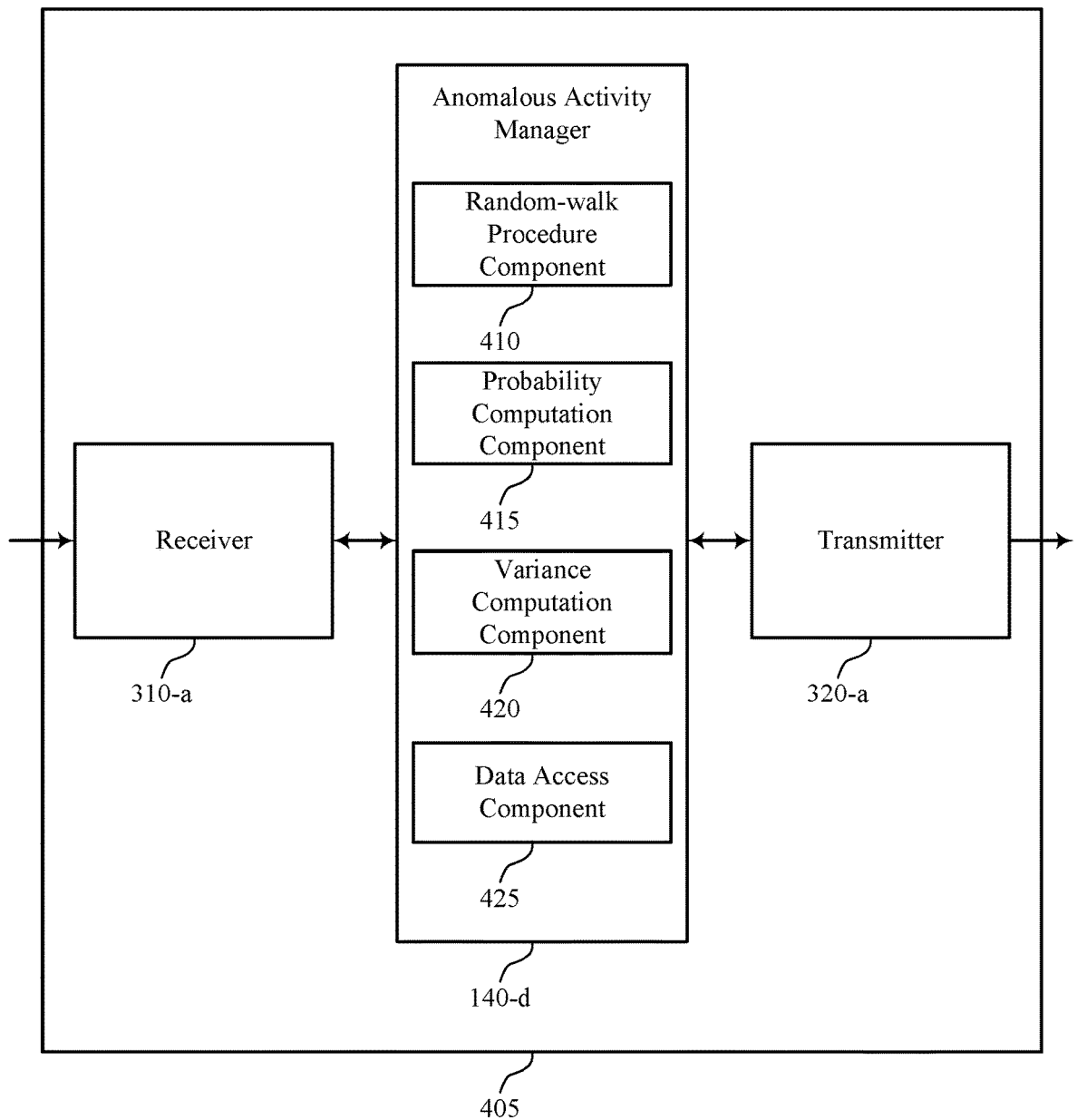

FIG. 4 illustrates a block diagram 400 of a device 405 that supports insider threat detection under user-resource bi-partite graphs, in accordance with one or more aspects of the present disclosure. Device 405 may be an example of aspects of device 105, devices 105-a, server 110, server 110-a, or device 305 as described with reference to FIGS. 1 through 3. Device 405 may include one or more processors. Each of the components of device 405 may be in communication (e.g., via one or more buses).

Receiver 310-a may receive data corresponding to the user-file access patterns of a device, including information regarding a bi-partite mapping of the system, data associated with a random-walk procedure, temporal data stored at a database, and the like. Receiver 310-a may receive the data via an exchange server associated with a target domain of the device 405. Receiver 310-a may communicate with server 110 or computing device 145 over a network 115 as described with reference to FIG. 1. A received message and components of the message may be passed on to other components of the device 305. In some cases, receiver 310 may be an example of aspects of the transceiver 625 described with reference to FIG. 6. The receiver may utilize a single antenna or a set of antennae.

Anomalous activity manager 140-d may be an example of aspects of anomalous activity manager 140-a, 140-b, and 140-c with reference to FIGS. 1 and 3. Anomalous activity manager 140-d may also include a random-walk procedure component 410, a probability computation component 415, a variance computation component 420, and a data access component 425.

Random-walk procedure component 410 may evaluate a bi-partite mapping of a system, and a weighting of one or more alternative users and/or files of the system. In some cases, random-walk procedure component 410 may be pre-configured to perform a specified number of iterative steps. Random-walk procedure component 410 may initiate one or more random-walk procedures, and select an alternative user and/or file according to the evaluated weighting of the associated resources.

Probability computation component 415 may evaluate the access frequency of each alternate user and/or file of the system for each random-walk procedure. Based on the evaluation, probability computation component 415 may generate a probability distribution. The probability distribution may include the access frequency of each of the alternate users and/or files of the bi-partite mapping. In some cases, the probability distribution may compose a probability vector, and may be normalized. In some cases, probability computation component 415 may determine additional iterations of random-walk procedure at random-walk procedure component 410 and probability computation, in accordance with a pre-configured threshold value of the component.

Variance computation component 420 may evaluate temporal data comprising at least probability distribution data at a time period preceding the implemented random-walk procedure of random-walk procedure component 410, and compare the temporal data to the generated probability distribution of device 405. Based on the comparison, variance computation component 420 may calculate a variance of the compared distributions. For example, variance computation component 420 may compare the generated probability distribution to at least one probability distribution of the temporal data and compute one or more points of maximum variance between the compared distributions.

Data access component 425 may compare the one or more points of variance with a pre-configured threshold value of the component and determine if anomalous activity is present. In the case of anomalous activity, data access component 425 may initiate a data access procedure. Data access component 425 may initiate procedure to access raw data associated with at least the device 405 and alternative files and/or users associated with the points of maximum variance to identify anomalous activity at one or more time periods, including the duration of the generated probability distribution, the one or more durations of the temporal data, and the like. In some cases, data access component 425 may access the raw data via direct connection to one or more alternative computing devices, databases, files, or users. In other cases, data access component 425 may evaluate received data in accordance with one or more computing devices, databases, files, or users via one or more network links and processing at receiver 310. Data access component 425 may then enact one or more security protocols based on the data access procedure. The security protocols may be on a local basis associated with one or more individual or sets of users and/or files, or the network system as a whole.

Transmitter 320-a may perform at least one of transmit signals generated by other components of the device 405, provide notification to one or more components of the device 405, and route data information. In some examples, transmitter 320-a may be collocated with receiver 310-a in a transceiver component. For example, transmitter 320-a may be an example of aspects of the transceiver 625 described with reference to FIG. 6. Transmitter 320-a may utilize a single antenna or a set of antennae.

Figure 5:
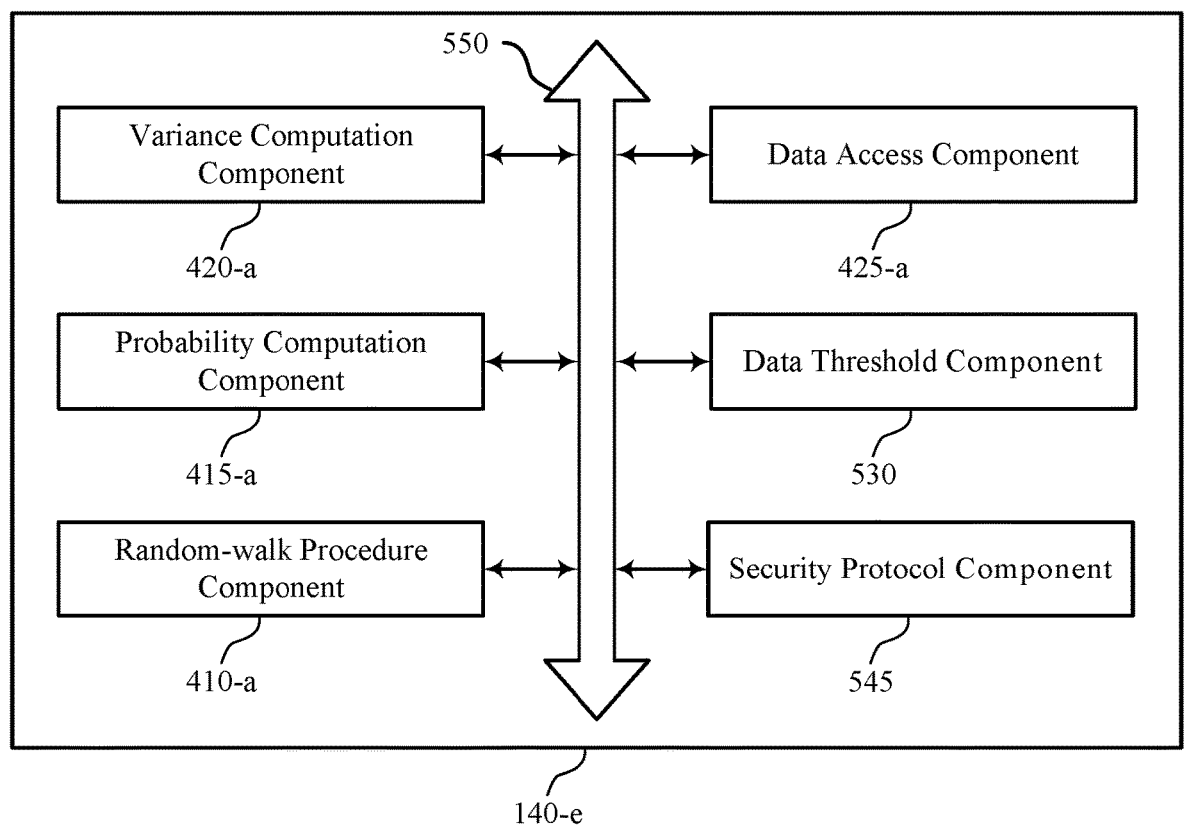

FIG. 5 illustrates a block diagram 500 of a device that supports insider threat detection under user-resource bi-partite graphs, in accordance with one or more aspects of the present disclosure. The anomalous activity manager 140-e may be an example of aspects of anomalous activity manager 140, 140-a, 140-b, 140-c, and 140-d with reference to FIGS. 1, 3, and 4. The anomalous activity manager 140-e may include random-walk procedure component 410-a, probability computation component 415-a, variance computation component 420-a, data access component 425-a, data threshold component 530, and security protocol component 545. Each of the components and managers may communicate, directly or indirectly with one another (e.g., via one or more buses 550).

Random-walk procedure component 410-a evaluate a bi-partite mapping of a set of users and a set of files including at least a user containing anomalous activity manager 140-*e*. Random-walk procedure component 410-*a* may also evaluate a weighting of one or more alternative users and/or files of the system. In some cases, random-walk procedure component 410-*a* may be pre-configured to perform a specified number of iterative steps. Random-walk procedure component 410-*a* may initiate one or more random-walk procedures, and select of an alternative user and/or file according to the evaluated weighting of the associated resources.

Probability computation component 415-*a* may evaluate the access frequency of each alternate user and/or file of the system for each random-walk procedure. Based on the evaluation, probability computation component 415-*a* may generate a probability distribution. The probability distribution may include the access frequency of each of the alternate users and/or files of the bi-partite mapping. In some cases, the probability distribution may compose a probability vector, and may be normalized. In some cases, probability computation component 415-*a* may communicate with random-walk procedure component 410-*a*, via bus 550, and initiate subsequent random-walk procedure and probability computation, in accordance with a pre-configured threshold value of the component.

Variance computation component 420-*a* may evaluate temporal data comprising at least probability distribution data at a time period prior to the implemented random-walk procedure of random-walk procedure component 410-*a*, and compare the temporal data to the generated probability distribution of probability computation component 415-*a*. Based on the comparison, variance computation component 420-*a* may calculate a variance of the compared distributions. For example, variance computation component 420-*a* may compare the generated probability distribution to at least one probability distribution of the temporal data and compute one or more points of maximum variance between the compared distributions.

Data access component 425-*a* may compare the one or more points of variance with a pre-configured threshold value of data threshold component 530, and determine if anomalous activity is present. In the case of anomalous activity, data access component 425-*a* may initiate a data access procedure. Data access component 425 may initiate procedure to access raw data associated with at least the device of the computed probability distribution, and alternative files and/or users associated with the points of maximum variance. Data access component 425-*a* may identify anomalous activity at one or more time periods, based on the initiated procedure. In some cases, data access component 425-*a* may access the raw data via direct connection to one or more alternative computing devices, databases, files, or users. In other cases, data access component 425-*a* may evaluate received data in accordance with one or more computing devices, databases, files, or users via one or more network links.

Data threshold component 530 may configure and store one or more data threshold values associated with access patterns at users of the set of users or files of the set of files of the system. In some cases, the threshold values may be configured on an individual user and individual file basis. In other cases, the threshold values may be configured on a neighborhood, set, or system basis. The threshold values configured at data threshold component 530 may include binary (e.g., flag) values, numerical values, numerical ranges, and the like. In some cases, data threshold component 530 may dynamically alter threshold values in accordance with one or more timing mechanisms, user settings, data configurations, and processors of a device (e.g., device 105, device 305, or device 405), configurations of a network (e.g., network 115), or settings of the one or more servers (e.g., server 110) as described with reference to FIG. 1.

Data threshold component 530 may interact with random-walk procedure component 410-*a*, probability computation component 415-*a*, variance computation component 420-*a*, and data access component 425-*a* to determine at least if one or more points of maximum variance associated with alternate users and/or files are malicious. Data threshold component 530 may interact with one or more components of anomalous activity manager 140-*e* to compare one or more characteristics of the points of maximum variance with one or more threshold values stored at data threshold component 530.

Security protocol component 545 may configure and determine one or more security procedures related to anomalous user-file access patterns, via one or more components of anomalous activity manager 140-*e*. Security protocol component 545 may include command instructions for indicating (i.e., flagging) malicious resources and initiating security procedure. Security procedure may include instructions for user notification via an interface of a device and in some cases, indicating file-access activity. IN some cases, security protocol component 545 may be configured to receive an indication of malicious activity from a component of anomalous activity manager 140-*e*, and provide command instructions associated with security procedure to the component.

Figure 6:
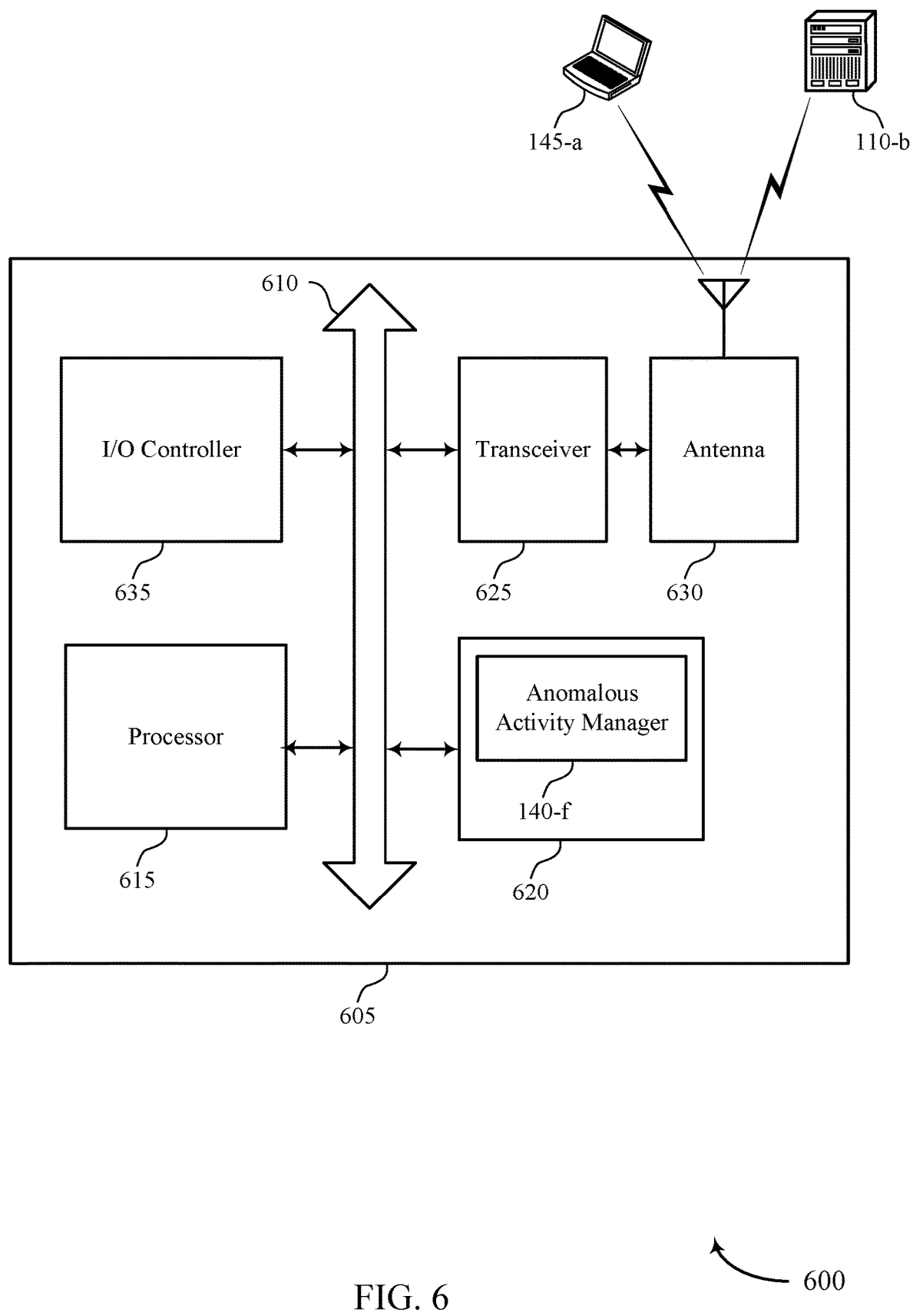
FIG. 6 depicts a block diagram of a system including a computing device and a server that support insider threat detection under user-resource bipartite graphs, in accordance with one or more aspects of the present disclosure.

FIG. 6 depicts a block diagram of a computer system 600, including a device 605, a computing device 145-*a*, and a server 110-*b* that support insider threat detection under user-resource bi-partite graphs, in accordance with one or more aspects of the present disclosure. The device 605 and computing device 145-*a* may be an example of device 105, 305, and 405, or computing device 145 as described with reference to FIG. 1 through 4. Device 605 may include a bus 610 which interconnects major subsystems of device 605, such as one or more processor 615, a system memory 620 (typically RAM, but which may also include ROM, flash RAM, or the like), an I/O controller 635, a transceiver 625, and an antenna 630.

Bus 610 allows data communication between a processor 615 and system memory 620, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, anomalous activity manager 140-*f*, to implement the present techniques, may be stored within system memory 620. Anomalous activity manager 140-*f* may be an example of the anomalous activity manager 140, 140-*a*, 140-*b*, 140-*c*, 140-*d*, and 140-*e* with reference to FIGS. 1, 3, 4, and 5. Applications resident within device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 7:
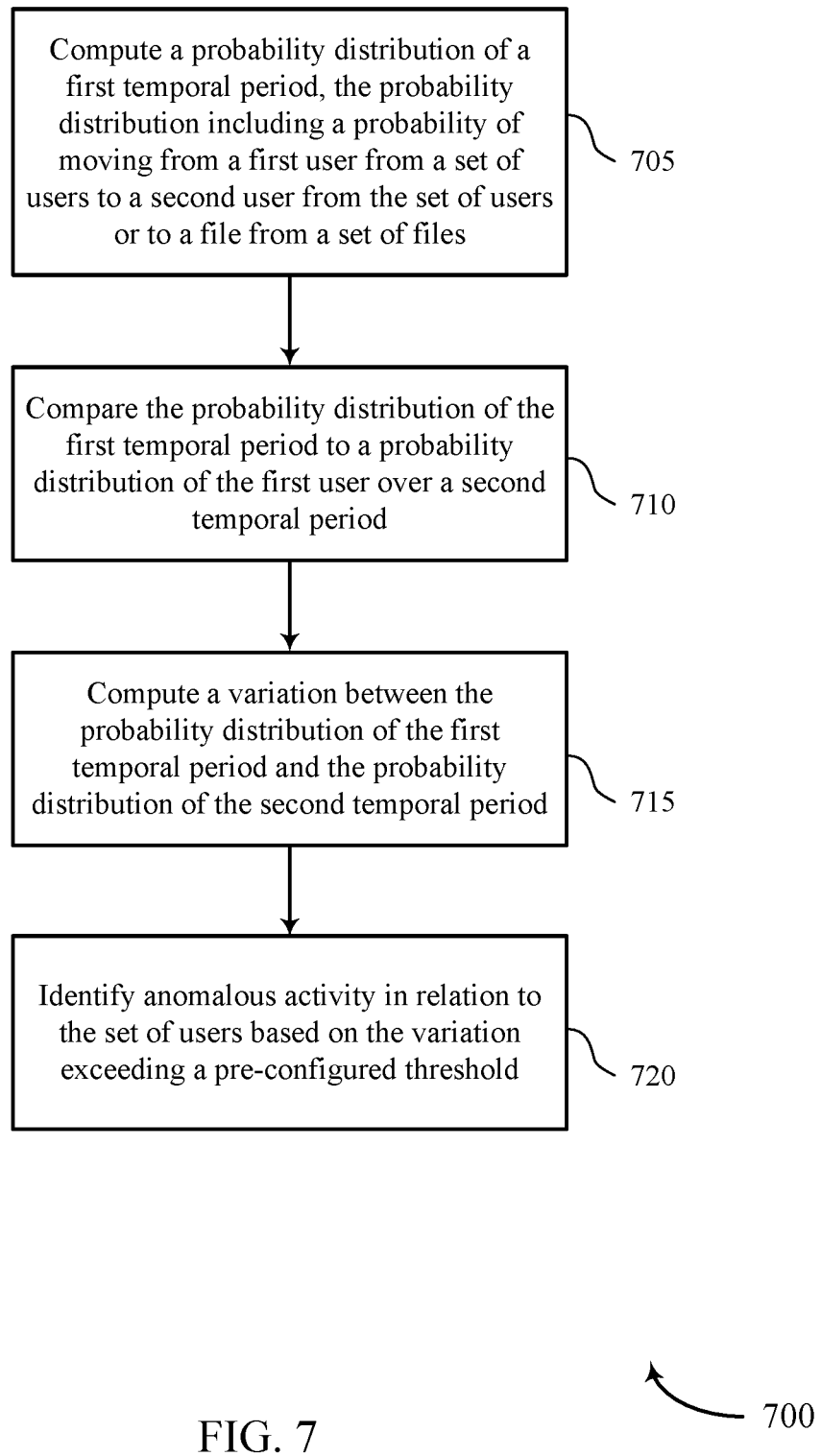
FIGS. 7 through 9 illustrate methods of insider threat detection under user-resource bi-partite graphs, in accordance with one or more aspects of the present disclosure.

FIG. 7 illustrates a method 700 for insider threat detection under user-resource bi-partite graphs, in accordance with one or more aspects of the present disclosure. The operations of method 700 may be implemented by device 105, computing device 145, and/or server 110 and its components as described herein. In some configurations, the method 700 may be implemented by the anomalous activity manager 140 as described with reference to FIGS. 1, 3, 4, 5, and 6. In some examples, device 105, computing device 145, and/or server 110 may execute a set of codes to control the functional elements of device 105, computing device 145, and/or server 110 to perform the functions described below.

Additionally or alternatively, device 105, computing device 145, and/or server 110 may perform aspects of the functions described below using special-purpose hardware. In some configurations, the method 700 may be implemented in conjunction with user interface 130 or application 135 as described with reference to FIG. 1. In the following description of the method 700, the operations may be performed in a different order than the exemplary order shown. Certain operations may also be left out of the method 700, or other operations may be added to the method 700.

At block 705, device 105, computing device 145, and/or server 110 may compute a probability distribution of a first temporal period, the probability distribution including a probability of moving from a first user from a set of users to a second user from the set of users, or to a file from a set of files. In some cases, the probability distribution may be computed as a vector and normalized. The operations of block 705 may be performed according to the methods described herein. In certain examples, aspects of the operations of block 705 may be performed by a probability computation component as described with reference to FIGS. 4 and 5.

At block 710, device 105, computing device 145, and/or server 110 may compare the probability distribution of the first temporal period to a probability distribution of the first user over a second temporal period. The second temporal period may include a recorded temporal period prior to the first temporal period. The operations of block 710 may be performed according to the methods described herein. In certain examples, aspects of the operations of block 710 may be performed by a variance computation component as described with reference to FIGS. 4 and 5.

At block 715, device 105, computing device 145, and/or server 110 may compute a variation between the probability distribution of the first temporal period and the probability distribution of the second temporal period. The computed variation may include computing one or more points of maximum variational distance between the compared distributions. The operations of block 715 may be performed according to the methods described herein. In certain examples, aspects of the operations of block 715 may be performed by a variance computation component as described with reference to FIGS. 4 and 5.

At block 720, device 105, computing device 145, and/or server 110 may identify anomalous activity in relation to the set of users based on the variation exceeding a pre-configured threshold of the manager. The operations of block 720 may be performed according to the methods described herein. In certain examples, aspects of the operations of block 720 may be performed by a data access component as described with reference to FIGS. 4 and 5.

Figure 8:
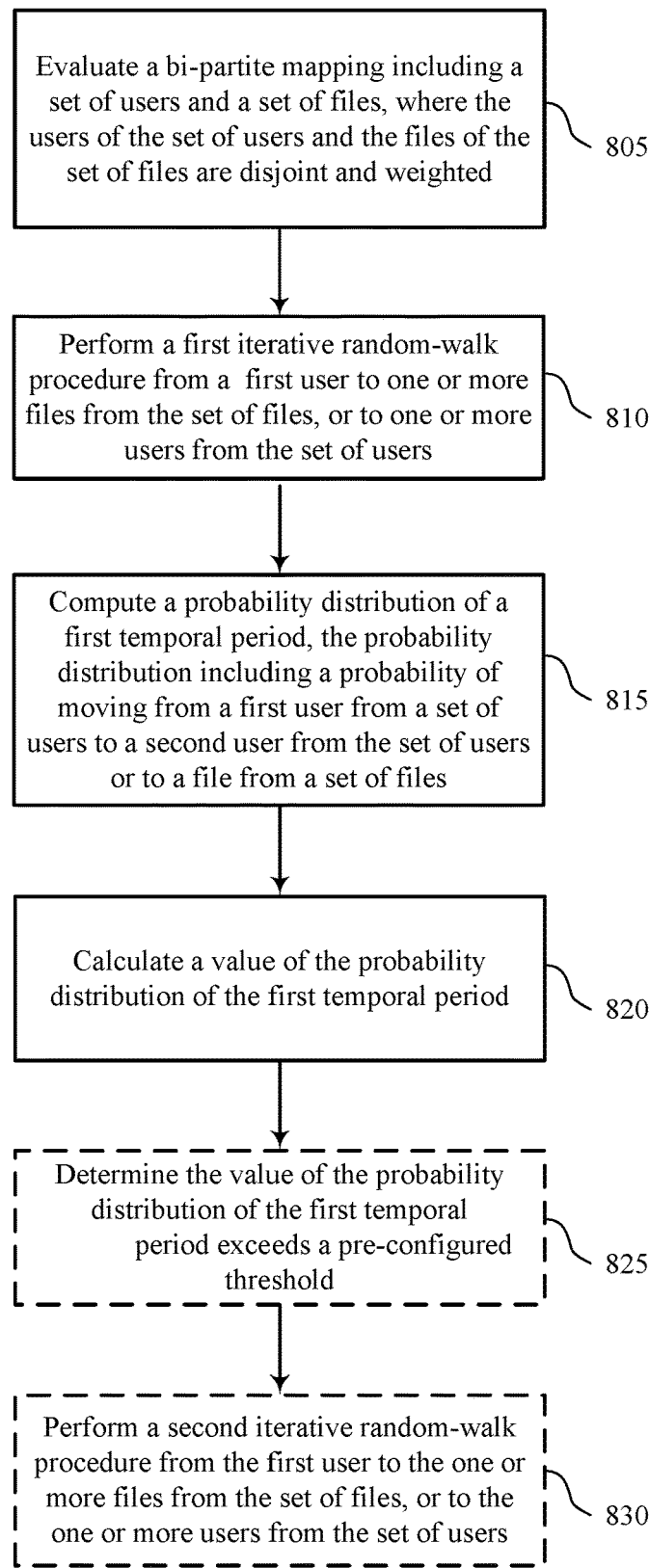

FIG. 8 illustrates a method 800 for insider threat detection under user-resource bi-partite graphs, in accordance with one or more aspects of the present disclosure. The operations of method 800 may be implemented by device 105, computing device 145, and/or server 110 and its components as described herein. In some configurations, the method 800 may be implemented by the anomalous activity manager 140 as described with reference to FIGS. 1, 3, 4, 5, and 6. In some examples, device 105, computing device 145, and/or server 110 may execute a set of codes to control the functional elements of device 105, computing device 145, and/or server 110 to perform the functions described below.

Additionally or alternatively, device 105, computing device 145, and/or server 110 may perform aspects of the functions described below using special-purpose hardware. In some configurations, the method 800 may be implemented in conjunction with user interface 130 or application 135 as described with reference to FIG. 1. In the following description of the method 800, the operations may be performed in a different order than the exemplary order shown. Certain operations may also be left out of the method 800, or other operations may be added to the method 800.

At block 805, device 105, computing device 145, and/or server 110 may evaluate a bi-partite mapping including one or more edges interconnecting a set of users of a system and a set of files of the system, where the users of the set of users and the files of the set of files are weighted. The users and/or files of the system may be weighted according or one or more criterion or access parameters associated with the mapping. The operations of block 805 may be performed according to the methods described herein. In certain examples, aspects of the operations of block 805 may be performed by a random-walk procedure component as described with reference to FIGS. 4 and 5.

At block 810, device 105, computing device 145, and/or server 110 may perform a first iterative random-walk procedure from a first user to one or more files from the set of files, or to one or more users from the set of users. The operations of block 810 may be performed according to the methods described herein. In certain examples, aspects of the operations of block 810 may be performed by a random-walk procedure component as described with reference to FIGS. 4 and 5.

At block 815, device 105, computing device 145, and/or server 110 may compute a probability distribution of a first temporal period, the probability distribution including a probability of moving from a first user from a set of users to a second user from the set of users, or to a file from a set of files. In some cases, the probability distribution may be computed as a vector and normalized. The operations of block 815 may be performed according to the methods described herein. In certain examples, aspects of the operations of block 815 may be performed by a probability computation component as described with reference to FIGS. 4 and 5.

At block 820, device 105, computing device 145, and/or server 110 may calculate a value of the probability distribution of the first temporal period. In some cases, the value may correspond to a scalar value (e.g., a vector norm) of the calculated probability distribution. The operations of block 820 may be performed according to the methods described herein. In certain examples, aspects of the operations of block 820 may be performed by a probability computation component as described with reference to FIGS. 4 and 5.

At block 825, device 105, computing device 145, and/or server 110 may determine the value of the probability distribution of the first temporal period exceeds a pre-configured threshold. The operations of block 825 may be performed according to the methods described herein. In certain examples, aspects of the operations of block 825 may be performed by a probability computation component and/or data threshold component as described with reference to FIGS. 4 and 5.

At block 830, and based on determining the value exceeds the preconfigured threshold, anomalous activity manager 140 may perform a second iterative random-walk procedure from the first user to the one or more files from the set of files, or the one or more users from the set of users. The operations of block 830 may be performed according to the methods described herein. In certain examples, aspects of the operations of block 830 may be performed by a probability computation component and/or data threshold component as described with reference to FIGS. 4 and 5.

Figure 9:
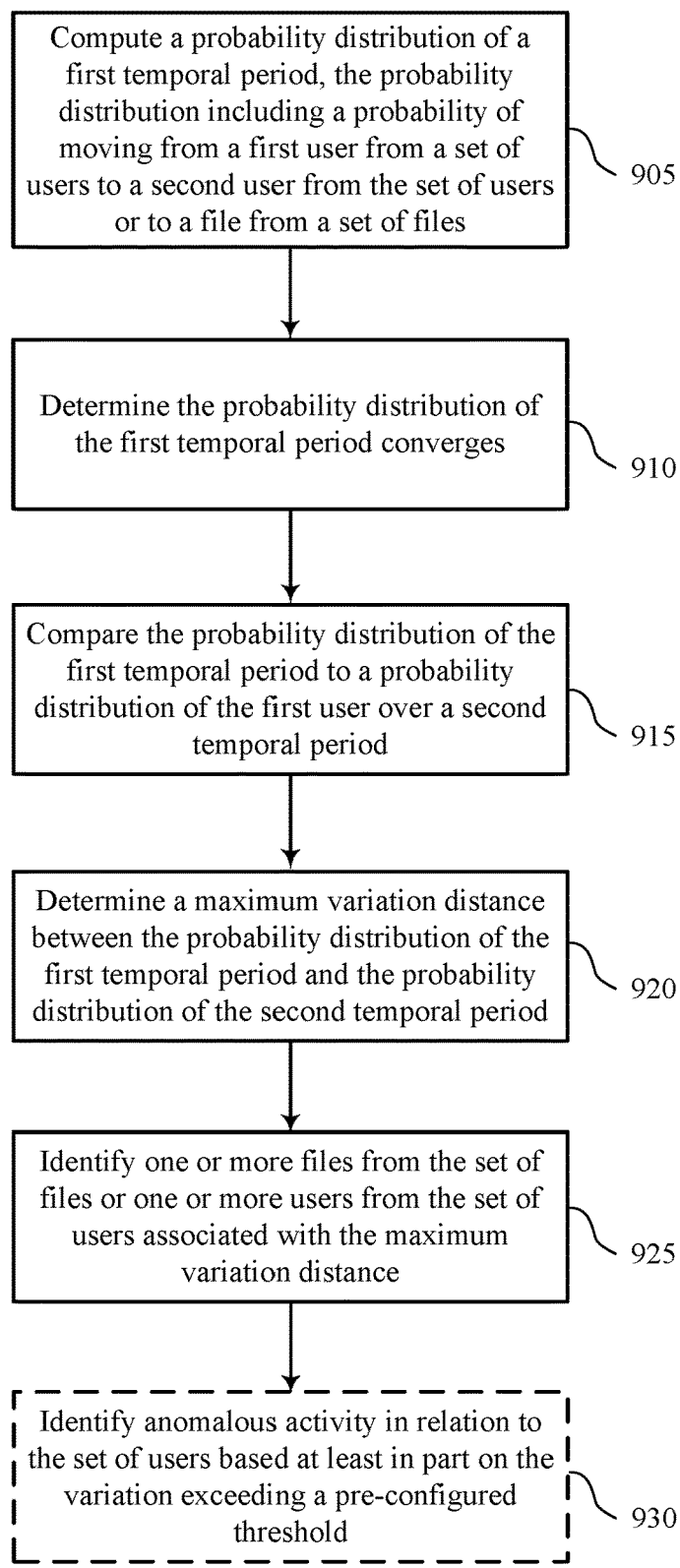

FIG. 9 illustrates a method 900 for insider threat detection under user-resource bi-partite graphs, in accordance with one or more aspects of the present disclosure. The operations of method 900 may be implemented by device 105, computing device 145, and/or server 110 and its components as described herein. In some configurations, the method 900 may be implemented by the anomalous activity manager 140 as described with reference to FIGS. 1, 3, 4, 5, and 6. In some examples, device 105, computing device 145, and/or server 110 may execute a set of codes to control the functional elements of device 105, computing device 145, and/or server 110 to perform the functions described below. Additionally or alternatively, device 105, computing device 145, and/or server 110 may perform aspects of the functions described below using special-purpose hardware. In some configurations, the method 900 may be implemented in conjunction with user interface 130 or application 135 as described with reference to FIG. 1. In the following description of the method 900, the operations may be performed in a different order than the exemplary order shown. Certain operations may also be left out of the method 900, or other operations may be added to the method 900.

At block 905, device 105, computing device 145, and/or server 110 may compute a probability distribution of a first temporal period, the probability distribution including a probability of moving from a first user from a set of users to a second user from the set of users, or to a file from a set of files. In some cases, the probability distribution may be computed as a vector and normalized. The operations of block 905 may be performed according to the methods described herein. In certain examples, aspects of the operations of block 905 may be performed by a probability computation component as described with reference to FIGS. 4 and 5.

At block 910, device 105, computing device 145, and/or server 110 may determine the probability distribution of the first temporal period converges. In some examples, device 105, computing device 145, and/or server 110 may determine convergence by comparing a scalar value (e.g., vector norm) of the computed probability distribution to a preconfigured threshold value. The operations of block 910 may be performed according to the methods described herein. In certain examples, aspects of the operations of block 910 may be performed by a probability computation component as described with reference to FIGS. 4 and 5

At block 915, device 105, computing device 145, and/or server 110 may compare the probability distribution of the first temporal period to a probability distribution of the first user over a second temporal period. The second temporal period may include a recorded temporal period prior to the first temporal period. The operations of block 915 may be performed according to the methods described herein. In certain examples, aspects of the operations of block 915 may be performed by a variance computation component as described with reference to FIGS. 4 and 5.

At block 920, device 105, computing device 145, and/or server 110 may determine a maximum variation distance between the probability distribution of the first temporal period and the probability distribution of the second temporal period. The operations of block 920 may be performed according to the methods described herein. In certain examples, aspects of the operations of block 920 may be performed by a variance computation component as described with reference to FIGS. 4 and 5.

At block 925, device 105, computing device 145, and/or server 110 may identify one or more files from the set of files, or one or more users from the set of users associated with the maximum variation distance. The operations of block 925 may be performed according to the methods described herein. In certain examples, aspects of the operations of block 925 may be performed by a data access component as described with reference to FIGS. 4 and 5.

At block 930, device 105, computing device 145, and/or server 110 may identify anomalous activity in relation to the set of the users based on the variation exceeding a preconfigured threshold. The operations of block 930 may be performed according to the methods described herein. In certain examples, aspects of the operations of block 930 may be performed by a data access component as described with reference to FIGS. 4 and 5.

Figure 10:
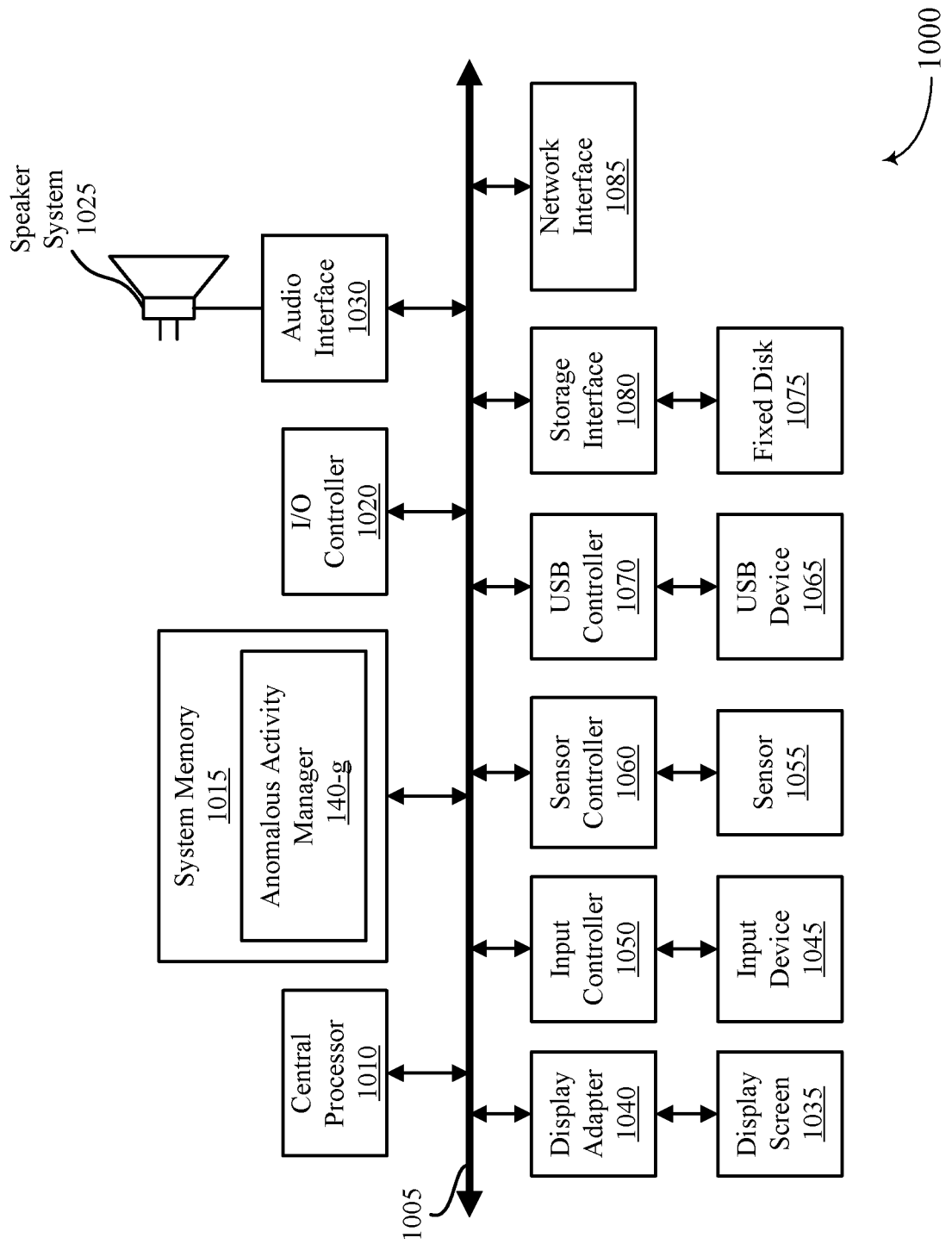
FIG. 10 illustrates a block diagram of a computer system that supports insider threat detection under user-resource bi-partite graphs, in accordance with one or more aspects of the present disclosure.

FIG. 10 illustrates a block diagram of a computer system 1000 that supports insider threat detection under user-resource bi-partite graphs, in accordance with one or more aspects of the present disclosure. The computer system 1000 may be an example of device 105, 305, and 405, or computing device 145, or server 110 as described with reference to FIG. 1 through 4. In one configuration, computer system 1000 includes a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple universal serial buses (USB) devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or devices. For example, the anomalous activity manager 140-g, to implement the present techniques, may be stored within the system memory 1015. Applications (e.g., application 135) resident with computer system 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via network interface 1085.

Storage interface 1080, as with the other storage interfaces of computer system 1000, can connect to a standard computer readable medium for storage and/or retrieval of information, such as a fixed disk drive 1075. Fixed disk drive 1075 may be a part of computer system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present techniques. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on computer system 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computer system 1000 may include wireless communication signals such as radio frequency, electromagnetics, local area network (LAN), wide area network (WAN), metropolitan area network (MAN), virtual private network (VPN), wireless network (using 802.11, for example), cellular network (using 3G and/or LTE, for example), and/or other signals. The network interface 1085 may enable one or more of wide wireless area network (WWAN), e.g., (GSM, CDMA, and WCDMA), wireless local area network (WLAN) (including BLUETOOTH® and Wi-Fi), WMAN (WiMAX) for mobile communications, antennas for Wireless Personal Area Network (WPAN) applications (including a radio frequency identification device (RFID) and UWB), etc.

The I/O controller 1020 may operate in conjunction with network interface 1085 and/or storage interface 1080. The network interface 1085 may enable computer system 1000 with the ability to communicate with client devices (e.g., device 105 of FIG. 1), and/or other devices over the network 115 of FIG. 1. Network interface 1085 may provide wired and/or wireless network connections. In some cases, network interface 1085 may include an Ethernet adapter or Fiber Channel adapter. Storage interface 1080 may enable computer system 1000 to access one or more data storage devices. The one or more data storage devices may include two or more data tiers each. The storage interface 1080 may include one or more of an Ethernet adapter, a Fiber Channel adapter, Fiber Channel Protocol (FCP) adapter, a small computer system interface (SCSI) adapter, and iSCSI protocol adapter.

Figure 11:
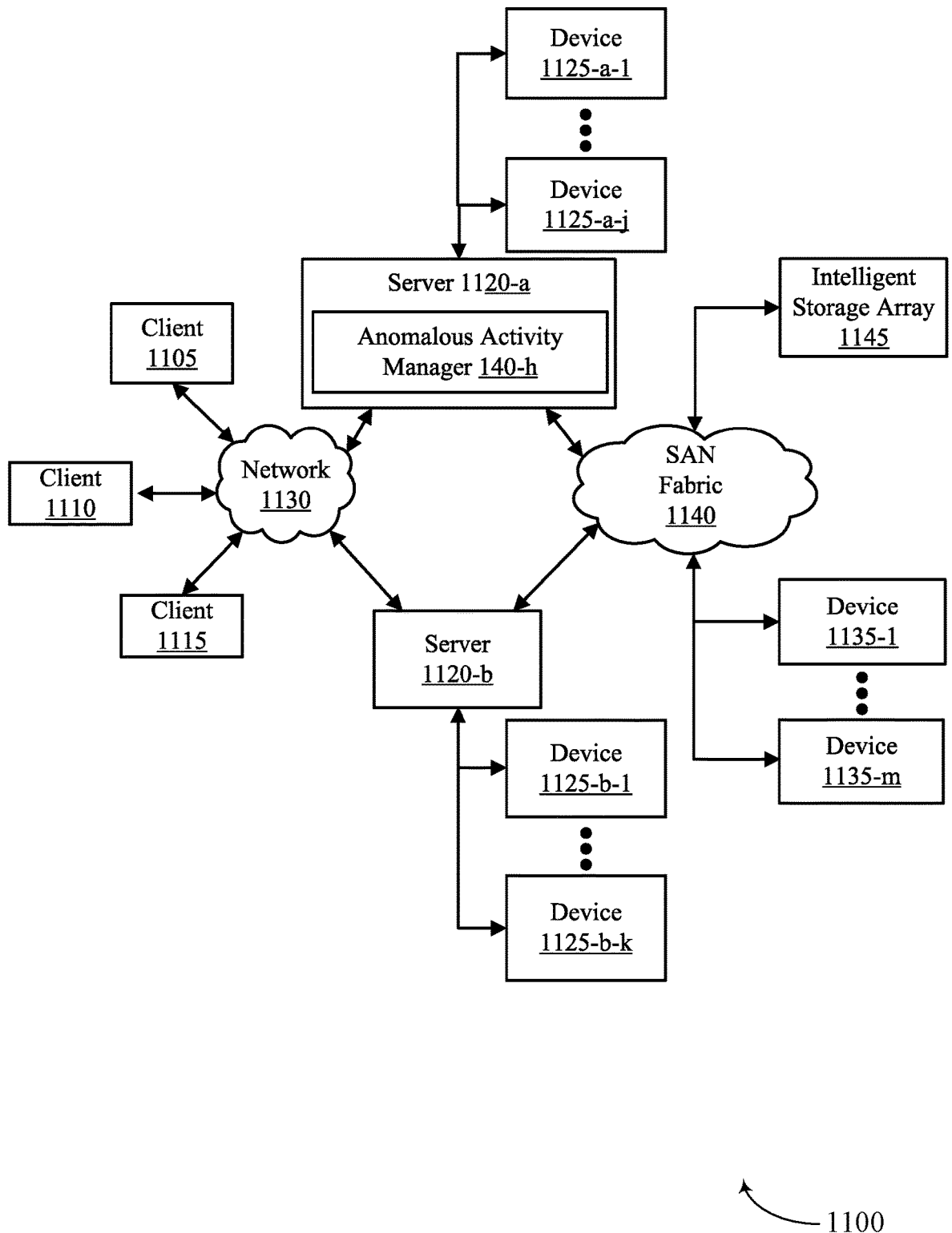
FIG. 11 illustrates a block diagram of a network architecture in which client systems and storage servers may be coupled to a network, in accordance with one or more aspects of the present disclosure.

FIG. 11 illustrates a block diagram of a network architecture 1100 in which client systems 1105, 1110, and 1115, and storage servers 1120-*a* and 1120-*b* may be coupled to a network 1130, in accordance with one or more aspects of the present disclosure. In one embodiment, the anomalous activity manager 140-*h* may be located within one of the storage servers 1120-*a*, 1120-*b* to implement the present techniques. The anomalous activity manager 140-*h* may be one example of anomalous activity manager 140, 140-*a*, 140-*b*, 140-*c*, 140-*d*, 140-*e*, 140-*f*, and 140-*g* depicted in FIGS. 1 and 3 through 6. The storage server 1120-*a* is further depicted as having storage devices 1125-*a*-1 through 1125-*a*-*j* directly attached, and storage server 1120-*b* is depicted with storage devices 1125-*b*-1 through 1125-*b*-*k* directly attached. Storage area network (SAN) fabric 1140 supports access to storage devices 1135-1 through 1135-*m* by storage servers 1120-*a* and 1120-*b*, and so by client systems 1105, 1110 and 1115 via network 1130. Intelligent storage array 1145 is also shown as an example of a specific storage device accessible via SAN fabric 1140.

With reference to network architecture 1100, a network interface or some other means or method can be used to provide connectivity from each of client systems 1105, 1110 and 1115 to network 1130. With reference to computer system 600, transceiver 625 or some other means or method can be used to provide connectivity from each of client systems 1105, 1110 and 1115 to network 1130. Client systems 1105, 1110 and 1115 are able to access information on storage server 1120-*a* or 1120-*b* using, for example, a web browser or other client software (not shown). Such a client allows client systems 1105, 1110 and 1115 to access data hosted by storage server 1120-*a* or 1120-*b* or one of storage devices 1125-*a*-1 through 1125-*a*-*j*, 1125-*b*-1 through 1125-*b*-*k*, 1135-1 through 1135-*m*, or intelligent storage array 1145. FIG. 11 depicts the use of a network such as the Internet for exchanging data, but the present techniques are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may configure a computing system to perform one or more of the exemplary embodiments disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A generalpurpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part on."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or internet protocol (IP) addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for detecting anomalous user-file access patterns in relation to a group of users and files, the group including at least a first user, a second user, and a file, the method being performed by one or more computing devices comprising at least one processor, the method comprising:

evaluating a bi-partite mapping comprising nodes and edges connecting the nodes, wherein the nodes represent the users and files of the group and the edges represent network links between the users and files, and wherein the nodes comprise a first node representing the first user, a second node representing the second user, and a third node representing the file;

computing a first file access frequency probability distribution for the first user over a first temporal period based at least in part on evaluating the bi-partite mapping;
computing a second file access frequency probability distribution for the first user over a second temporal period, the first and second file access frequency probability distributions each comprising a probability of the first user accessing the file;
computing a variation between the first file access frequency probability distribution and the second file access frequency probability distribution; and
identifying anomalous activity in relation to the group based at least in part on the variation exceeding a pre-configured threshold.

2. The method of claim 1, wherein the second temporal period precedes the first temporal period.

3. The method of claim 1,
wherein the nodes are weighted and grouped into a first set representing the users of the group and a second set representing the files of the group and the first and second sets are disjoint.

4. The method of claim 1, wherein evaluating the bipartite mapping further comprises:
partitioning the bi-partite mapping into one or more discrete subsets; and
selecting a subset of the one or more discrete subsets, the subset comprising the first node representing the first user.

5. The method of claim 1, wherein the probability of the first user accessing the file is based at least in part on (i) a number of edges connected to the first node, and (ii) a number of other nodes connected to the edges connected to the first node.

6. The method of claim 5, wherein the value of the first file access frequency probability distribution comprises a vector norm.

7. The method of claim 1, wherein computing the first file access frequency probability distribution further comprises:
performing, using the bi-partite mapping, a first iterative random-walk procedure from the first node to the second node or the third node, and
wherein the first file access frequency probability distribution is based at least in part on the performing the first iterative random-walk procedure.

8. The method of claim 7, further comprising:
determining that a value of the first file access frequency probability distribution exceeds a pre-configured threshold; and
performing, using the bi-partite mapping, a second iterative random-walk procedure from the first node to the second node or the third node, wherein computing the second file access frequency probability distribution is based at least in part on the performing the second iterative random-walk procedure.

9. The method of claim 1, wherein computing the variation further comprises:
determining that the first file access frequency probability distribution converges; and
determining a maximum variation distance between the first file access frequency probability distribution and the second file access frequency probability distribution, the maximum variation distance exceeding the pre-configured threshold;
identifying the anomalous activity further comprises identifying the second user or the file as being associated with the maximum variation distance; and
the method further comprises performing a security action to protect against the anomalous activity.

10. The method of claim 9, wherein performing the security action comprises classifying the second user or the file associated with the maximum variation distance as anomalous.

11. The method of claim 9, wherein the second user or the file associated with the maximum variation distance indicates one or more arguments of maxima associated with a function of a bipartite mapping.

12. The method of claim 9, wherein identifying the anomalous activity further comprises:
correlating the second user or the file associated with the maximum variation distance to specific file access activity;
identifying the specific file access activity as anomalous activity;
identifying potential risks or threats to the group based at least in part on the correlating; and
determining one or more causes of the anomalous activity.

13. The method of claim 1, wherein identifying the anomalous activity further comprises identifying one or more anomalous files and/or users; and
the method further comprises performing a security action to protect against the anomalous activity based at least in part on identifying the one or more anomalous files and/or users.

14. A computing device configured for detecting anomalous user-file access patterns in relation to a group of users and files, the group including at least a first user, a second user, and a file, the computing device comprising:
one or more processors;
memory in electronic communication with the one or more processors, wherein the memory stores computer executable instructions that when executed by the one or more processors cause the one or more processors to:
evaluate a bi-partite mapping comprising nodes and edges connecting the nodes, wherein the nodes represent the users and files of the group and the edges represent network links between the users and files, and wherein the nodes comprise a first node representing the first user, a second node representing the second user, and a third node representing the file;
compute a first file access frequency probability distribution for the first user over a first temporal period based at least in part on evaluating the bi-partite mapping;
compute a second file access frequency probability distribution for the first user over a second temporal period, the first and second file access frequency probability distributions each comprising a probability of the first user accessing the file;
compute a variation between the first file access frequency probability distribution and the second file access frequency probability distribution; and
identify anomalous activity in relation to the group based at least in part on the variation exceeding a pre-configured threshold.

15. The computing device of claim 14,
wherein the nodes are weighted and grouped into a first set representing the users of the group and a second set representing the files of the group and the first and second sets are disjoint.

16. The computing device of claim 15, wherein compute the first file access frequency probability distribution further comprises:

perform, using the bi-partite mapping, a first iterative random-walk procedure from the first node to the second node or the third node,
wherein the first file access frequency probability distribution is based at least in part on the performing the first iterative random-walk procedure.

17. The computing device of claim 16, wherein when executed by the one or more processors, the computer executable instructions further cause the one or more processors to:
determine that a value of the first file access frequency probability distribution exceeds a preconfigured threshold; and
perform, using the bi-partite mapping, a second iterative random-walk procedure from the first node to the second node or the third node, wherein computing the second file access frequency probability distribution is based at least in part on the performing the second iterative random-walk procedure.

18. The computing device of claim 14, wherein compute the variation further comprises:
determine that the first file access frequency probability distribution converges; and
determine a maximum variation distance between the first file access frequency probability distribution and the second file access frequency probability distribution the maximum variation distance exceeding the preconfigured threshold;
and wherein identify the anomalous activity further comprises identify the second user or file as being associated with the maximum variation distance; and
when executed by the one or more processors, the computer executable instructions further cause the one or more processors to perform a security action to protect against the anomolous activity.

19. The computing device of claim 18, wherein perform the security action further comprises:
correlate the second user or the file associated with the maximum variation distance to specific file access activity;
identify the specific file access activity as anomalous activity;
identify potential risks or threats to the group based at least in part on the correlating; and
determine one or more causes of the anomalous activity.

20. A non-transitory computer-readable medium storing computer executable instructions that when executed by one or more processors cause the one or more processors to:
evaluate a bi-partite mapping comprising nodes and edges connecting the nodes, wherein the nodes represent the users and files of the group and the edges represent network links between the users and files, and wherein the nodes comprise a first node representing the first user, a second node representing the second user, and a third node representing the file;
compute a first file access frequency probability distribution for a first user over a first temporal period based at least in part on evaluating the bi-partite mapping;
compute a second file access frequency probability distribution for the first user over a second temporal period, the first and second file access frequency probability distributions each comprising a probability of the first user accessing a file, wherein the first user, the second user, and the file are included in a group of users and files;
compute a variation between the first file access frequency probability distribution and the second file access frequency probability distribution; and
identify anomalous activity in relation to the group based at least in part on the variation exceeding a preconfigured threshold.

* * * * *